US010341627B2

(12) United States Patent
Bandringa et al.

(10) Patent No.: US 10,341,627 B2
(45) Date of Patent: Jul. 2, 2019

(54) SINGLE-HANDED FLOATING DISPLAY WITH SELECTABLE CONTENT

(75) Inventors: John S. Bandringa, Everett, WA (US); Dean Jeffrey Bidwell, Renton, WA (US); William A. Marty, Seattle, WA (US); Steven Tzu-Yen Peng, Irvine, CA (US)

(73) Assignee: INTERMEC IP CORP., Fort Mill, SC (US)

( * ) Notice: Subject to any disclaimer, the term of this patent is extended or adjusted under 35 U.S.C. 154(b) by 323 days.

(21) Appl. No.: 13/535,928

(22) Filed: Jun. 28, 2012

(65) Prior Publication Data

US 2014/0002337 A1    Jan. 2, 2014

(51) Int. Cl.
| | |
|---|---|
| *H04N 9/31* | (2006.01) |
| *G06F 3/03* | (2006.01) |
| *G06F 3/033* | (2013.01) |
| *G06F 3/0346* | (2013.01) |
| *G02B 27/64* | (2006.01) |
| *G09G 5/08* | (2006.01) |

(52) U.S. Cl.
CPC ......... *H04N 9/3194* (2013.01); *G02B 27/646* (2013.01); *G06F 3/03* (2013.01); *G06F 3/033* (2013.01); *G06F 3/0317* (2013.01); *G06F 3/0346* (2013.01); *H04N 9/3185* (2013.01); *G09G 5/08* (2013.01)

(58) Field of Classification Search
CPC ........ G06F 3/03; G06F 3/0304; G06F 3/0308; G06F 3/0312; G06F 3/0317; G06F 3/0325; G06F 3/0346; G06F 3/0354; G06F 3/0321; G06F 3/033; G02B 27/20; G04N 9/3194; G04N 9/3185; G09N 5/74; G09G 5/08

USPC ................................. 345/156–158, 179–183
See application file for complete search history.

(56) References Cited

U.S. PATENT DOCUMENTS

| | | | | |
|---|---|---|---|---|
| 3,941,001 | A | | 3/1976 | LaSarge |
| 6,003,774 | A | * | 12/1999 | Bard ................... G04B 37/0016 235/462.45 |
| 7,090,137 | B1 | * | 8/2006 | Bennett ................... G02B 27/01 235/462.45 |
| 7,252,394 | B1 | | 8/2007 | Fu |
| 7,284,866 | B2 | * | 10/2007 | Buchmann ......... G02B 26/0816 353/121 |
| 7,392,951 | B2 | * | 7/2008 | Ray ..................... G06K 7/10851 235/462.01 |
| 7,434,464 | B2 | | 10/2008 | Li |

(Continued)

*Primary Examiner* — Jason M Mandeville
(74) *Attorney, Agent, or Firm* — Additon, Higgins & Pendleton, P.A.

(57) ABSTRACT

A system, method, and/or apparatus for displaying and selecting information using a single, handheld device is provided. The handheld device includes a combined projection and selection tool that projects a user interface for selection of information by the same device. As incorporated into a single unit, the components of the handheld device generally include a camera, a light-emitting component, and a projector, with at least one of the components being stabilized relative to the movement of the handheld device. At least a part of the projected image from the handheld device is selectable based on the position of the stabilized component relative to the position of a nonstabilized component. The handheld also includes a trigger for selection of one or more of the projected items based on position of a laser indicator pointed at the projected image.

19 Claims, 6 Drawing Sheets

(56) References Cited

U.S. PATENT DOCUMENTS

| | | | |
|---|---|---|---|
| 7,486,274 B2* | 2/2009 | Forlines et al. | 345/157 |
| 8,016,198 B2* | 9/2011 | May | G06K 7/0008 235/454 |
| 8,884,876 B2* | 11/2014 | Song | G06F 3/03542 345/158 |
| 9,100,681 B2* | 8/2015 | Virolainen | G06F 3/0425 |
| 2001/0030668 A1* | 10/2001 | Erten | G06F 3/0304 715/863 |
| 2005/0139677 A1* | 6/2005 | Tan et al. | 235/462.36 |
| 2005/0280628 A1* | 12/2005 | Adams et al. | 345/156 |
| 2006/0146015 A1* | 7/2006 | Buchmann | 345/156 |
| 2007/0040800 A1* | 2/2007 | Forlines | G06F 3/0325 345/158 |
| 2007/0205980 A1* | 9/2007 | Dijk | 345/156 |
| 2007/0216644 A1* | 9/2007 | Nam | G06F 3/0321 345/158 |
| 2007/0296695 A1* | 12/2007 | Shi | H04N 1/00204 345/157 |
| 2008/0037090 A1 | 2/2008 | Miller et al. | |
| 2008/0295035 A1* | 11/2008 | Mattila | G06F 3/04815 715/848 |
| 2009/0090782 A1* | 4/2009 | May | G06K 7/0008 235/462.21 |
| 2010/0036393 A1* | 2/2010 | Unsworth | G01D 5/262 606/130 |
| 2010/0199232 A1* | 8/2010 | Mistry | G06F 1/163 715/863 |
| 2010/0217161 A1* | 8/2010 | Shalgi | A61B 5/6843 601/2 |
| 2011/0230238 A1* | 9/2011 | Aronsson et al. | 455/566 |
| 2011/0248913 A1* | 10/2011 | Willis et al. | 345/156 |
| 2012/0162140 A1* | 6/2012 | Lee | G06F 3/0425 345/175 |
| 2013/0050206 A1* | 2/2013 | Willis et al. | 345/419 |
| 2013/0063646 A1* | 3/2013 | Ueno | G03B 21/142 348/333.1 |
| 2013/0126596 A1* | 5/2013 | Fletcher et al. | 235/375 |

* cited by examiner

SINGLE-HANDED FLOATING DISPLAY WITH SELECTABLE CONTENT

RELATED APPLICATIONS

Not applicable.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to a system, method, and/or apparatus for displaying and selecting information using a single, handheld device. Accordingly, the present invention provides a combined projection and selection tool that projects a user interface for selection of information by the same device. As incorporated into a single unit, the components of the handheld device generally include a camera, a light-emitting component, and a projector, with at least one of the components being stabilized relative to the movement of the handheld device.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
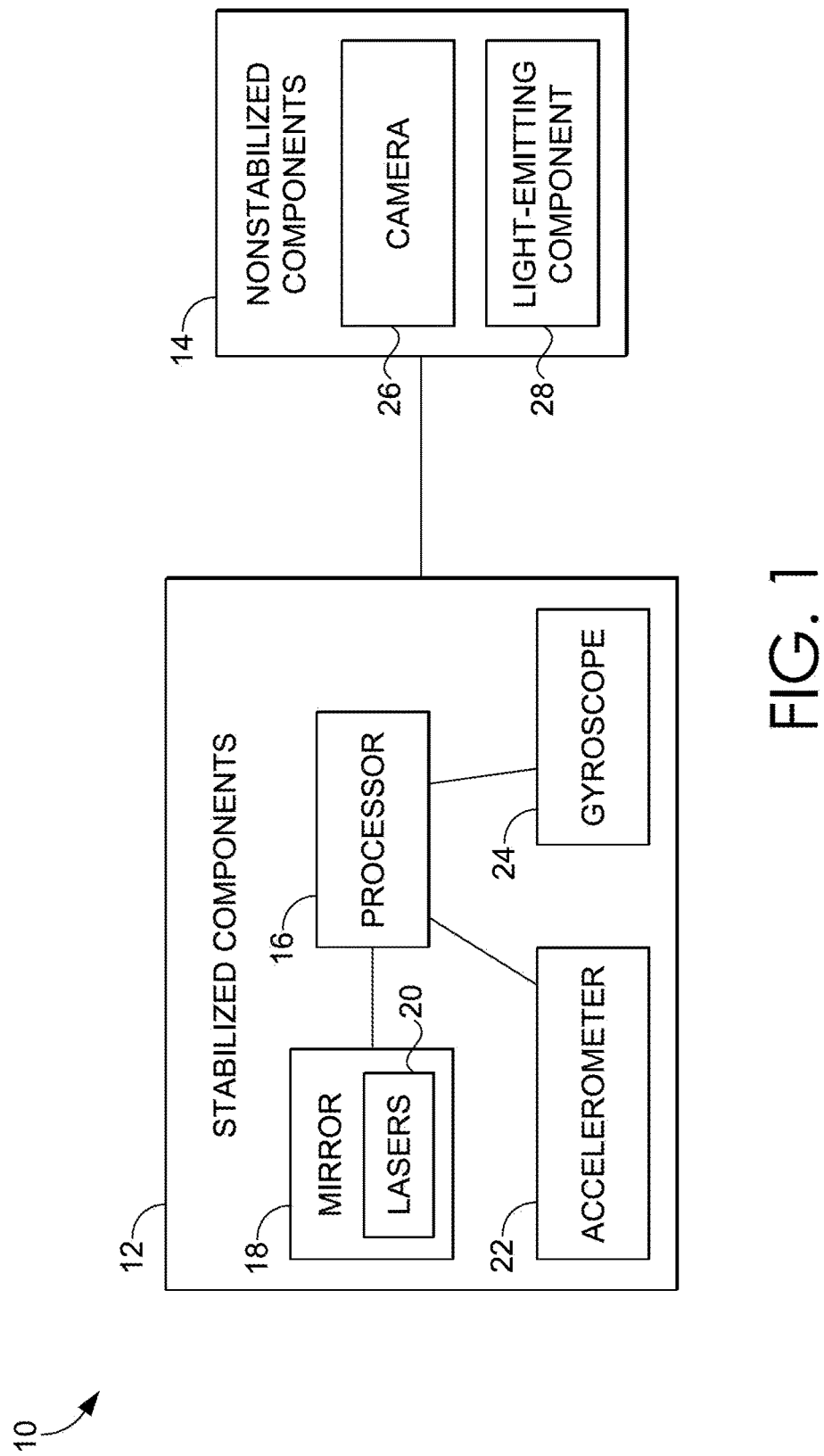
FIG. 1 is block diagram of components in a handheld device, in accordance with an embodiment of the present invention.

Embodiments of the present invention relate generally to a system, method, and/or apparatus for displaying and selecting information using a single, handheld device. Accordingly, the present invention provides a combined projection and selection tool that projects a user interface for selection of information by the same device. As incorporated into a single unit, the components of the handheld device generally include a camera, a light-emitting component, and a projector, with at least one of the components being stabilized relative to the movement of the handheld device.

The ability to reduce the number of hands needed to simultaneously collect information and enter related data based on that collected information can be challenging, as many times data is retrieved from one source while related data is entered into a second source. For example, a user may read a label on a box, while at the same time enter the number of boxes that need to be ordered into a separate device. Additionally, the size of display associated with portable devices is limited. For example, smart phones typically have a display size between three- to four and one-half inches, which leaves little room for simultaneous display and input of information.

The present invention enables one hand to be free, while the device is operated by a single hand during both display and selection of information. At the same time, the handheld device maintains a small size, while in some embodiments, still allowing a very small display surface on the device. Embodiments of the invention project an image from the handheld device that remains focused during display on a variety of surfaces. For example, embodiments of the handheld device can project onto a curved surface, or a surface not perpendicular to the projector, while remaining in focus. As such, although the projected image may be slightly skewed, the image is still in focus for the user.

Accordingly, the handheld device creates a portable user interface that can be projected onto a variety of surfaces and manipulated based on selection from the same device projecting the image. For example, a field service worker may be replacing something that is broken on an air conditioning unit. With only one free hand available, the worker may pull the trigger on the handheld device to wake up the device. In one embodiment, the handheld device then projects an image of a menu onto the side of the air conditioning unit. The projected menu might instruct the worker to take a picture of the air conditioning unit to use photo recognition to identify the unit, such as recognizing the model number of the air conditioning unit (and/or utilizing GPS to recognize the actual location of the particular air conditioning unit). The worker may then open the door or scan the motor assembly, realize that it needs a new belt, and take a picture of the part using the handheld device. Again using photo recognition, the handheld device may then automatically recognize the image of the belt and provide a subsequent menu. In addition or in alternative to using photo recognition for identifying the air conditioning unit and/or the belt, a bar code image may be scanned to identify the particular unit or particular part. After recognizing the belt, the projector may display a pull-down menu with a variety of options that are relevant to the identified belt part. Using the displayed pull-down menu and aiming the light-emitting component at the projected image, the user may then select to look up a technical menu, such as a parts menu for belts.

Upon selection of the particular belt needed, an additional menu may be displayed with multiple options, such as items instructing the system to 1) order the part now, or 2) save the order for later. Again, the user may make a selection using the light indicator projecting form the light-emitting component. After selecting the option to "order now," a command may be generated to have the particular belt scheduled for overnight shipping to the particular location. As such, all of the user's interactions from diagnosis to eventual ordering are conducted with the single handheld unit directed at a single surface, without the user having to toggle between multiple devices or redirect the user's direction away from the item being identified.

According to a first embodiment, the handheld device includes at least one stabilized component and a plurality of nonstabilized components. The handheld device is adapted to project at least one image on a surface to provide at least one projected image, at least a portion of the at least one projected image being selectable by the handheld device based on a position of the at least one stabilized component relative to a position of at least one of the nonstabilized components.

According to another embodiment, the handheld device comprises at least one camera; at least one projector adapted to project at least one image on a surface to provide at least one projected image; and at least one selection component adapted to project at least one selection indicator on the surface, wherein the handheld device is adapted to receive an indication of selection of at least a portion of the at least one projected image based on a position of the at least one selection indicator relative to a position of the at least one projected image.

According to yet another embodiment, the handheld device comprises a camera component adapted to capture an image of one or more items within a field of view; a light-emitting component adapted to project a light indicator on a surface; a projector component adapted to project a stabilized image on a surface; and a processor adapted to determine a position of the light indicator relative to the stabilized image.

Turning now to FIG. 1, a block diagram 10 of various components of one embodiment of the handheld device includes stabilized components 12 and nonstabilized components 14. As will be understood, FIG. 1 is only one example of the arrangement of components of the handheld device, as other combinations of stabilized and nonstabilized components are contemplated as part of the present invention. Further, the handheld device is not limited to the number of exemplary components of FIG. 1. For example, the exemplary handheld device components of FIG. 1 may also include a wireless adapter for communication with another handheld device and/or communication with a computing device having a processor and/or memory.

In one embodiment, stabilized components 12 includes a stabilized projection system having a processor 16 coupled to a mirror 18 with lasers 20, an accelerometer 22, and a gyroscope 24. In further embodiments, the stabilized projection system uses either an accelerometer 22 or a gyroscope 24 for stabilization.

Although depicted as being directly coupled to the processor 16, in embodiments, the stabilized projection system may have any number of stabilized components 12 that communicate with a processor 16 via any number of different types of connections. Accordingly, processor 16 does not have to be physically inside the handheld device, since the data projected and retrieved by the handheld device may be processed somewhere else and communicated back to the handheld device. As such, a handheld device may be directly or indirectly coupled to a computing device having a processor and/or memory. Further, the processor may execute computer-usable instructions embodied on computer-readable media, such as computer storage media. In embodiments, computer storage media includes media implemented in a method and/or technology for storing information, such as computer-usable instructions, data structures, program modules, and other data representations. Computer storage media may include, but is not limited to, RAM, ROM, EEPROM, flash memory or other memory technology, CD-ROM, digital versatile disc (DVD), and the like. Accordingly, a processor 16 may be used to determination of which items of data to project for selection by a user. In one embodiment, a processor 16 coupled directly to the handheld device processes the determination of the corresponding data to project for selection by a user, while in other embodiments, a remote processor 16 is accessed by the handheld device for a determination of the corresponding projected data.

The stabilized projection system having stabilized components 12 may also be referred to as a stabilized "projector" or a stabilized "imager." Accordingly, embodiments of the invention where the projector is not stabilized (i.e., the mirror 18 is not stabilized), might associate the accelerometer 22 and/or the gyroscope 24 with different stabilized components, such as a stabilized laser. Additionally, in embodiments that include either an accelerometer 22 or a gyroscope 24, one or both components may be used to stabilize a different component than the projector.

As shown in FIG. 1, the nonstabilized components 14 include a camera 26, which may also be referred to as a "scanner" as it "scans" images that it detects. For example, the camera 26 may scan a bar code on an object. As discussed in the example above, the camera 26 may be used to conduct photo recognition of a particular item. The same camera 26 may also be used to detect where a light indicator is directed on the projected image by the light-emitting component 28. Accordingly, the camera 26 simultaneously collects data regarding what is being displayed as part of the projected image (i.e., the portion of the projected image that is within the camera field of view) and where the light indicator of the light-emitting component 28 is being displayed.

In embodiments of the invention, the projector and/or "imager" projects an image on a surface. For example, a virtual keypad can be projected onto a surface where the user is pointing the handheld device. In another example, the projector may display a projected image of a pull-down list, or another type of interactive display. Accordingly, while the handheld device has a camera 26 that is taking a picture of the field of view, the same handheld device has a projector that is projecting something into the field of view. In embodiments, the projector is gyroscopically stabilized (using gyroscope 24) so that the projected image remains stable while a user is manipulating the handheld device. In other words, the projected image remains still on the surface, while the user moves the handheld device to direct the light-emitting component 28 toward a particular item in the projected image.

In further embodiments, additional and/or alternative means are used to stabilize the projected image. In embodiments, a microelectromechanical (MEM) mirror 18, as part of the stabilized projector, may be used to raster an image by moving the mirror 18 that is reflecting the lasers 20. For example, a picoprojector using an MEM mirror may raster an image by moving a mirror 18 that is reflecting and/or relocating a light image, such as an image projected from lasers 20. In embodiments, lasers 20 include red, green, and blue lasers.

In another embodiment, in addition to utilizing camera recognition technology to determine where the light-emitting component 28 is pointing on the projected display, the handheld device may utilize grid technology to detect the presence of something within the field of view based on the positioning of the pointed light-emitting component 28, regardless of the actual content displayed by the projector. As such, software (i.e., computer-readable instructions) may be utilized that generates a grid of the field of view, and the camera may therefore recognize the presence of the light indicator (coming from the light-emitting component 28) within a particular portion of the grid, regardless of what content is visibly projected into that portion of the display. For example, a particular grid may be correlated to a particular pop-up display, such that the camera is used to detect the matching of the light indicator presence in a particular portion of the display, such as detecting the light indicator's presence on the display where the number five is located.

Accordingly, having the stabilized projected image, a user may utilize the same handheld device to select an item of information from the projected image using the light-emitting component 28. In embodiments, light-emitting component 28 may be a laser light source, a light emitting diode (LED), a focused stream of light or projected light source and/or any other light-emitting device capable of being projected onto a surface from the handheld device. In particular, embodiments of the handheld device include a light-emitting component that displays a light indicator on a surface, such as a laser pointer device that projects a laser light image onto a surface.

In embodiments, the light-emitting component 28 may be manipulated with respect to the projected image such that the light-emitting component 28 can provide an indication of a selected item of information in the projected image. For example, in one embodiment, while the projected image stays stabilized, the light-emitting component 28 may move to the number three, and the number three may be selected by the handheld device. Similarly, a user could point the light indicator at multiple consecutive numbers, and then select an "enter" button that indicates the series of selected numbers is complete. In that example, the projected image also remains stabilized while the various numbers are selected and the handheld device is used to maneuver the light-emitting component 28, and the corresponding light indicator on the surface.

Figure 2A:
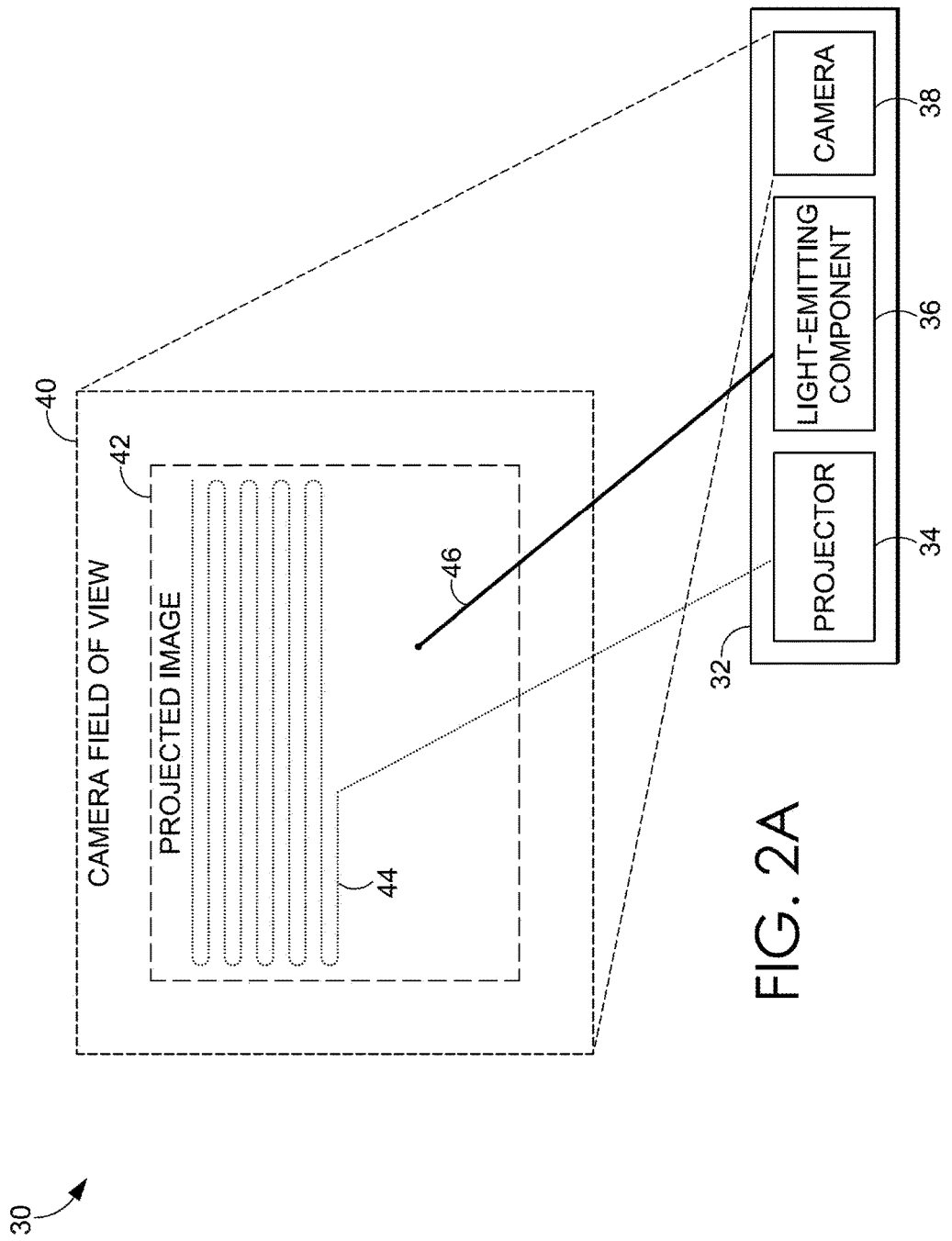
FIG. 2A is a perspective view of a handheld device with a projected image displayed on a surface, in accordance with an embodiment of the present invention.

FIG. 2A is a perspective view 30 of one embodiment of the handheld device 32. Handheld device 32 includes a projector 34, a light-emitting component 36, and a camera 38. In embodiments, at least one of the projector 34, light-emitting component 36, and camera 38 is stabilized. Handheld device 32 has a camera field of view 40 associated with camera 38, and a projected image 42 having data items 44, which make up the projected image 42. For selecting one or more data items 44, light-emitting component 36 may direct a light indicator 46 at a portion of the projected image 42. In embodiments, camera 38 detects the location of light indicator 46 as within the camera field of view 40. In further embodiments, projected image 42 is projected onto a surface as within a rectangular area, creating a rectangular-shaped image, by virtue of being a gimbaled image projected by an MEM mirror.

In one embodiment, handheld device 32 may project a selection indicator from projector 34 instead of a light indicator 46, for providing an indication of selection of projected data. For example, in the same way that projector 34 may project a user interface onto a surface for selection of one or more data items 44, projector 34 may also project a selection indicator, such as a mouse and/or pointing mechanism on a traditional computing device display. In that embodiment, instead of a light-emitting component 36 projecting a light indicator 46 onto the projected image 42, the projector 34 may project both the stabilized projected image 42 and a nonstabilized selection indicator (such as a mouse or pointer). Accordingly, a user may manipulate the location of the selection indicator within the camera field of view 40 based on movement of the handheld device 32. For example, a handheld device 32, such as a smartphone, may project a stabilized projected image 42 and a nonstabilized selection indicator, from the same device. In one embodiment, one or more on-board motion sensors associated with the handheld device 32 may be used to translate the location of the selection indicator displayed on the surface, with respect to the position of data items 44 within the projected image 42.

In embodiments where the projected image 42 is stabilized, the handheld device 32 can detect movement of the projected image 42 and counteract such movement while gimbaling the image to adjust and/or steady the image. Accordingly, if the handheld device 32 is moved slightly upward, and hence the projector 34 is moved slightly upward, a gyroscope (such as gyroscope 24) and/or an accelerometer (such as accelerometer 22) may be used to determine an input perspective, thereby monitoring how much the projected image 42 is being moved and/or how fast it is being accelerated. As a result of the input perspective, a processor associated with handheld device 32 may then determine the extent of movement of the handheld device, and direct the gimbaled mirror 18 to adjust accordingly so that, from the point of view of the user, the projected image 42 appears stabilized.

In one embodiment, light-emitting component 36 is not stabilized, and directs a light indicator 46 at a portion of the projected image 42. Accordingly, the handheld device 32 may be moved by the user to direct the light indicator 46 where the user points the handheld device 32. In this example, the camera field of view 40 is also moving with the direction of the handheld device 32, as the camera 38 is not stabilized. Accordingly, when the light indicator 46 is on the part of the projected image 42 that the user wishes to select, the user may provide an indication of selection to the handheld device 32, such as a trigger pull or other indication of selection of the item being identified by the light indicator 46.

Although depicted in FIG. 2A as having a camera field of view 40 that is larger than the projected image 42, in some embodiments, the projected image 42 may be larger than the camera field of view 40. As such, in embodiments, the light indicator 46 will remain within the camera field of view 40 for selection of an item of data 44 that is within the portion of the projected image 42 captured by the camera 38, and targeted by the light-emitting component 36. As such, the item of data 44 being selected by light indicator 46 will, in some embodiments, remain inside the field of view 40, regardless of the size of the projected image 42.

As discussed above, in some embodiments, a processor associated with the handheld device 32 (such as processor 16) may be used to process feedback from the projected image 42 being stabilized, such as feedback from a gyroscope and/or accelerometer tracking the orientation of the projected image 42. As used herein, a processor refers to any component that may be used to process information received or generated by a component associated with the handheld device 32. In embodiments, a processor is used to determine what items have been scanned by the handheld device, determine what items to present as part of a projected image, recognize which projected items have been selected by a light indicator, and/or generate a subsequent projected image, related command, or relevant instructions for the user of the handheld device. As such, the processor receives feedback from the image needing to be stabilized (such as when the user moves the handheld device 32 slightly upward). In embodiments, the processor is coupled to the camera 38 that is taking a picture of the field of view 40. The camera 38 then sends information to the processor, which is making the determination of whether the camera 38 "sees" the light indicator 46 inside the field of view 40.

In embodiments, camera 38 is indirectly connected to the processor, such as via a Bluetooth or other wireless connection. Accordingly, the wireless technology coupling the camera 38 and processor enables the processor to be located outside of the housing of the handheld device 32. For example, a processor on a user's smart phone may wirelessly communicate with the handheld device, thereby directing the device and camera without needing to be integrated into the handheld device 32 itself. As such, in some embodiments, directing of the display, adjustment, receipt, recognition, and/or identification of data by the handheld device 32 may be conducted by a processor incorporated into one or more components of the handheld device 32, or may be external to the handheld device 32 and in wireless communication therewith.

Figure 2B:
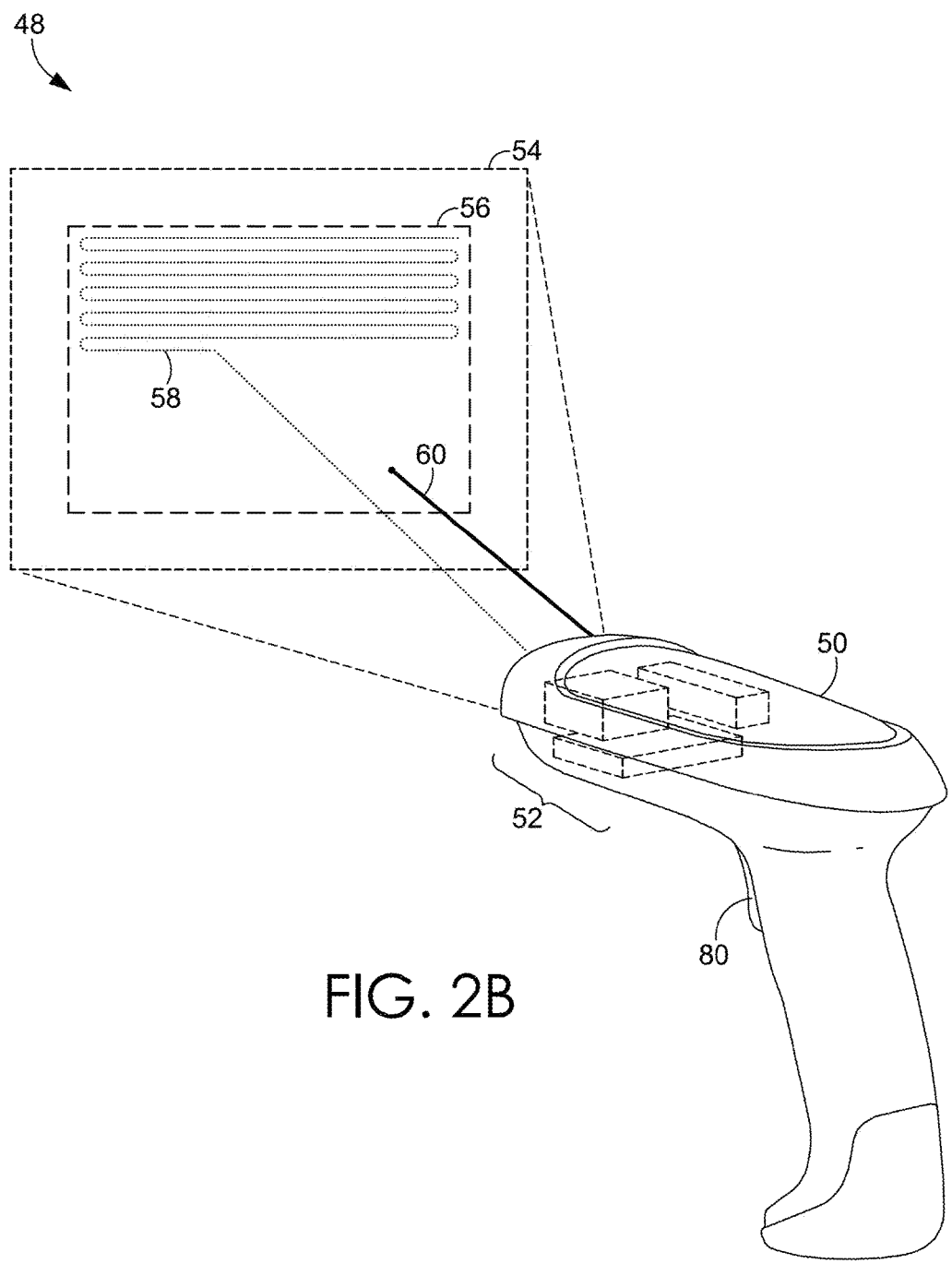
FIG. 2B is a perspective view of components of a handheld device in relation to a projected image displayed on a surface, in accordance with an embodiment of the present invention.

Turning now to FIG. 2B, a perspective view 48 of one embodiment of a handheld device 50, having various components 52, is shown in relation to a camera field of view 54 and a projected image 56 displayed on a surface. As will be understood, although FIG. 2B includes various components 52, the components of handheld device 50 may be combined into a single unit, such as a solid state silicon/MEMS enclosure. Accordingly, separate components and/or blocks are depicted for illustrative purposes only.

One or more data items 58 may be selected by light indicator 60, as directed by the user manipulating handheld device 50. In a traditional user interface environment, a user may receive information displayed on a screen and input related information onto a separate keypad or stylus device. However, embodiments of the present invention combine the functionality of both the display and input components into the single, handheld device 50. Accordingly, the point of vision and the human interface are combined into a single interface that is portable rather than restricted to a particular screen. As discussed above in various embodiments, by having at least one of the components 52 stabilized, the handheld device 50 may be moved to select one or more data items 58, while maintaining a stabilized projected image 56. Accordingly, a range of movement of the projected image 56 may be defined such that a processor directs the adjustment of the projected image 56 accordingly, such as in response to a set of parameters for movement, or an acceptable range of movement during which the data items 58 may still be selectable by the light indicator 60. For example, a user may define a measured amount of movement of the projected image 56 that is within an acceptable range. In some embodiments, an acceptable range of movement of the projected image 56 may be determined based on a threshold amount of movement within which one or more of the components 52 may be able to detect the selection of a data item 58 by the light indicator 60.

Once a user has manipulated the handheld device 50 such that the light indicator 60 is indicating a particular portion of the projected image 56, a trigger 80 may be used to provide an indication of selection of a particular data item 58. As such, while the components of the handheld device 50 monitor the field of view 54 for the presence of the light indicator 60, one or more indications of selection are received by the handheld device 50 to indicate a particular data item selection, such as an indication of what the user is ordering, selecting, opening, expanding, etc., on the projected image 56.

As noted in the introductory example, the trigger 80 may also be used to "wake up" the handheld device 50. As such, the handheld device 50 may remain in a resting or inactive state, until activated via the initial pulling on the trigger 80. In embodiments, upon pulling the trigger 80 to wake up the handheld device 50, a first display screen may be projected as the projected image 56. In some embodiments, the first display screen could provide multiple options to the user, such as the options to 1) put the handheld device back to sleep, 2) start a new project, or 3) continue a previously-saved project. One of multiple options may be selected by aiming the handheld device 50 and the corresponding light indicator 60 onto the selected option number, and depressing the trigger 80. As a result of selecting a first option, a second display screen may then be provided as the projected image 56, providing a subset of menu items for selection by the user that are related to the first selected item. For example, if a subset of menu items prompts a user to enter a number of units of an item to order, a subsequent display (third) may provide a confirmation instruction asking the user to confirm that the number of items selected should be ordered.

In embodiments, the light indicator 60 may be beaming onto the surface from the handheld device 50 only when there is an item of information needing to be selected from the projected image 42. Accordingly, when there is a need for operator input, in some embodiments, light indicator 60 will be displayed within the field of view 54 (as projected from a light-emitting component) for manipulation by a user. In further embodiments, a zoom control function may be associated with the handheld device 50 that allows a user to point the handheld device at an item on the projected image 56, select the trigger 80, and indicate to the projector of the handheld device 50 to enlarge the view of the item being selected.

As will be understood, any number of devices may be used as part of the trigger 80, such as a button, switch, track pad, soft key, trigger, capacitive touch pad, mechanical device, capacitive device, and the like. Accordingly, trigger 80 may be any component adapted to receive an indication of a selection of at least a portion of the projected image 56, such as one or more data items 58. For example, if projected image 56 includes multiple keys as part of a projected keyboard interface, a trigger 80 may be a capacitive touch pad that the user moves a finger across to select a particular key in the display. In further embodiments, in addition to receiving an indication of selection for the trigger 80, a capacitive touch pad may also be used to direct the movement of the light indicator 60 on the projected image 56.

Figure 3A:
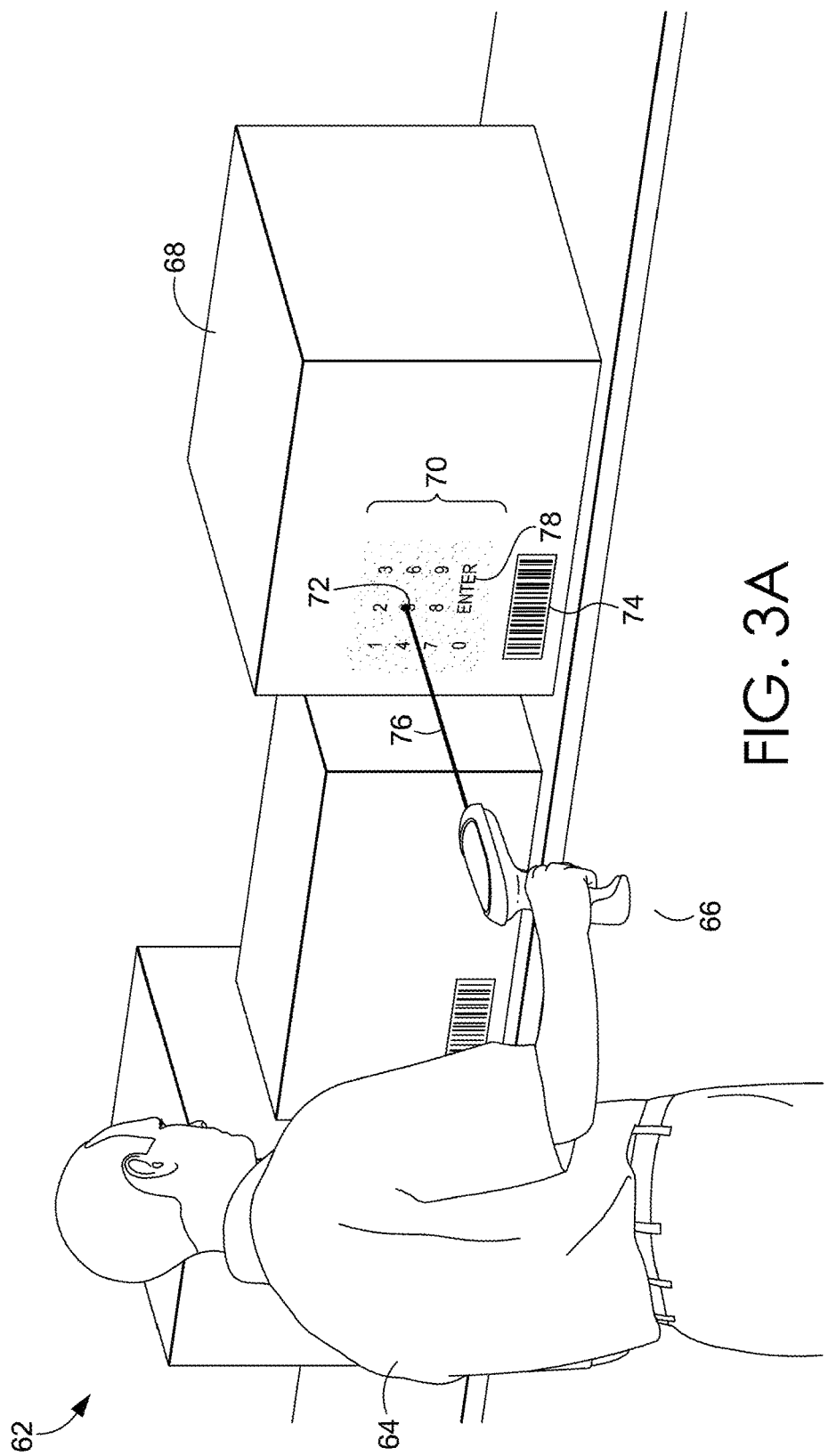
FIG. 3A is a perspective view of a user selecting an item displayed using a handheld device, in accordance with an embodiment of the present invention.

Referring to FIG. 3A, a perspective view 62 includes a user 64 selecting an item displayed using a handheld device 66, according to one embodiment of the invention. In the example of FIG. 3A, handheld device 66 is projecting a user interface onto a surface of work item 68, with a projected image 70 including multiple numeric data items 72 and a completion indicator 78 (the "enter" button). As will be understood, in this example, bar code is not part of projected image 70, but is rather an identifying marking on the outside surface of the work item 68 that indicates to the handheld device 66 which work item is being assessed.

Figure 3B:
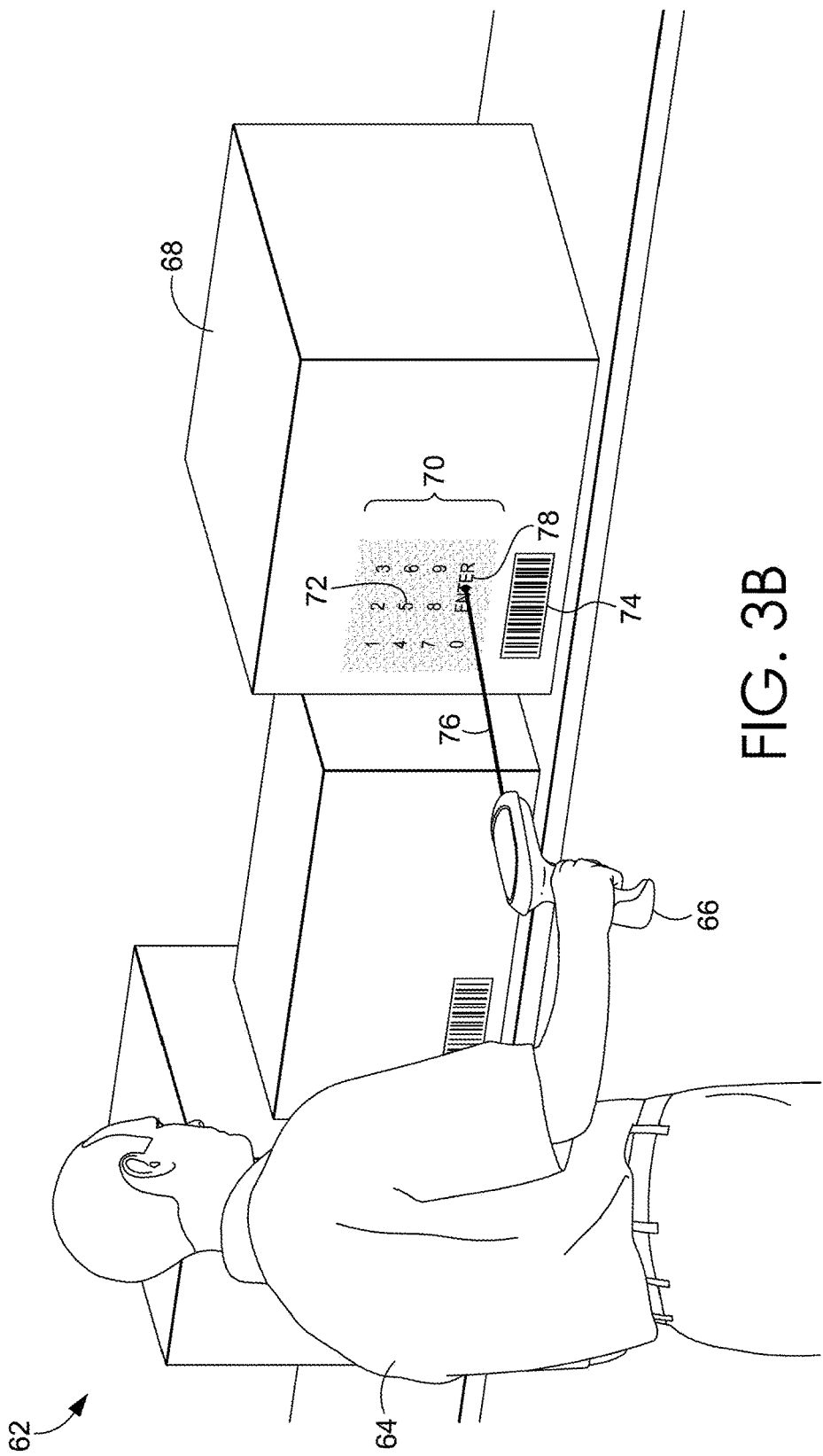
FIG. 3B is a perspective view of a user selecting an item displayed using a handheld device, in accordance with an embodiment of the present invention.

In one embodiment, a user may initially scan the bar code 74 of work item 68 using the camera on the handheld device 66. The handheld device 66, based on recognizing one or more commands and/or options associated with the particular scanned work item 68, may present a menu relevant to the particular item as part of a projected image 70. For example, a menu asking the user whether the user wants to generate a new order for work item 68, or retrieve an existing order for work item 68, may be projected by handheld device 66. Upon selection of the "generate new order" option, a subsequent projected image 70 of a numeric keypad may be displayed, such as the projected image 70 of FIG. 3A. The user may then provide an indication of the number of units the user wants to order—in this case, the user may indicate that five units are to be ordered by selecting numeric data item 72 with the light indicator 76. As shown in FIG. 3B, the user may then indicate by selecting completion indicator 78 to "enter" the order for five units.

In further embodiments, handheld device 66 may be equipped with a GPS system and/or wireless Internet connectivity, such that the information collected by the handheld device 66 may be communicated to a remote location. For example, a GPS component associated with the handheld device 66 in FIG. 3B may be used to indicate which building to ship the newly ordered five items. Further, in the example discussed above, GPS may be used to indicate to a monitoring system which unit is being repaired and the building where the unit is located, for ordering and directing of the associated parts, or providing other functions relative to the location of the device. Similarly, wireless and/or GPS technology may be used to coordinate the handheld device 66 with a personal area network, a wire area network, a network server, or other network, or coordinate information on the handheld device 66 with information on a different device of the user, such as a smart phone device.

Figure 4:
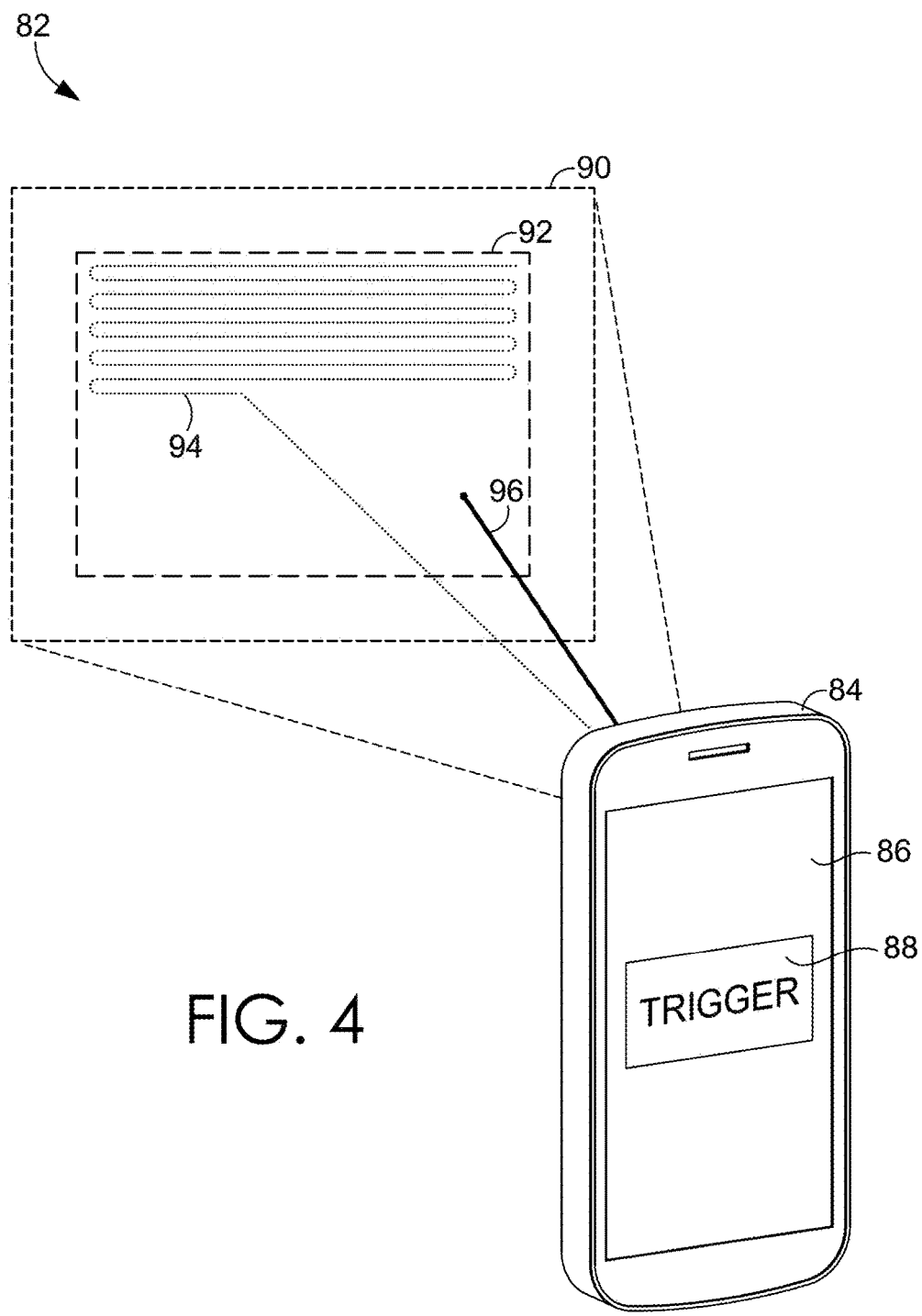
FIG. 4 is a perspective view of a handheld device with a projected image displayed on a surface, in accordance with an embodiment of the present invention.

Referring finally to FIG. 4, a perspective view 82 of an exemplary handheld device 84 has a camera field of view 90 that captures a projected image 92 displayed on a surface. In the embodiment of FIG. 4, the handheld device 84 is a computing device such as a smartphone, which has a capacitive touchscreen 86 that displays a trigger selection icon 88 for selecting items of data 94 within the projected image 92. In particular, as discussed above, the light indicator 96 may be directed by the user at the projected image 92. Accordingly, in one embodiment, handheld device 84 projects a stabilized projected image 92 onto a surface, while the handheld device 84 is manipulated by the user to direct the light indicator 96 onto a particular part of the projected image 92, without disturbing the presentation of the stabilized, projected image 92 emitted from the same device.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A barcode scanning device comprising:
a stabilized component having a projector;
a nonstabilized component having a light emitting component; and
a camera adapted to:
scan a work item including a barcode;
wherein the barcode scanning device is adapted to:
decode the barcode scanned by the camera to identify the work item;
project, via the projector and in response to decoding the barcode, a first user interface on a surface of the identified work item such that the projected first user interface is within a field of view of the camera, wherein the first user interface comprises one or more commands and/or options associated with the identified work item that are selectable by the barcode scanning device based on a position of the stabilized component relative to a position of the nonstabilized component, wherein the one or more commands and/or options of the projected first user interface are selected based on a position of a light indicator projected by the light emitting component within the projected first user interface;
detect a position of the light indicator relative to the projected first user interface by recognizing presence of the light indicator within a particular portion of a grid structure associated with the field of view of the camera and correlating the position of the light indicator detected by the camera with a command or option of the one or more commands and/or options of the projected first user interface based on the grid structure, wherein the grid structure is generated using grid technology and is independent of the projected first user interface;
receive an indication of a selection of the command or option based on a position of the selection indicator relative to a position of the projected first user interface; and
project a second user interface corresponding to the command or option in the first user interface in response to receiving the selection.

2. The barcode scanning device of claim 1, wherein the stabilized component further comprises:
a processor;
a mirror; and
one or more of an accelerometer and a gyroscope;
wherein the nonstabilized component comprises the camera.

3. The barcode scanning device of claim 1, wherein the nonstabilized component comprises the camera.

4. The barcode scanning device of claim 1, wherein the projected first user interface comprises a stabilized first user interface within the field of view of the camera.

5. The barcode scanning device of claim 1, wherein the projected first user interface is selectable by the nonstabilized component based on manipulation of a position of the nonstabilized component relative to a position of the stabilized component.

6. The barcode scanning device of claim 1, further comprising an input component adapted to receive an indication of a selection of at least a portion of the projected first user interface.

7. A barcode scanning device comprising:
a camera adapted to scan a work item including a barcode;
a processor adapted to identify and decode the barcode to identify the work item;
a projector adapted to project, in response to decoding the barcode, a first user interface on a surface of the identified work item, and to project a selection indicator on the surface of the identified work item, wherein one of the projected first user interface and the selection indicator is stabilized while the other is nonstabilized, and wherein the first user interface comprises one or more commands and/or options associated with the identified work item,
wherein the barcode scanning device is adapted to:
detect a position of the selection indicator relative to the projected first user interface by recognizing presence of the selection indicator within a particular portion of a grid structure associated with a field of view of the camera, and correlating the position of the selection indicator detected by the camera with a command or option of the one or more commands and/or options of the projected first user interface based on the grid structure, wherein the grid structure is generated using a grid technology and is independent of the projected first user interface;

receive an indication of a selection of the command or option based on a position of the selection indicator relative to a position of the projected first user interface; and project a second user interface corresponding to the command or option in the first user interface in response to receiving the selection.

8. The barcode scanning device of claim 7, wherein the projected first user interface is stabilized such that the projected first user interface is statically displayed on the surface within a range of movement.

9. The barcode scanning device of claim 8, wherein the stabilized projected first user interface is projected within the field of view of the camera.

10. The barcode scanning device of claim 8, wherein the selection indicator is manipulated by a user to provide the indication of selection based on a position of the selection indicator relative to a position of the first user interface.

11. The barcode scanning device of claim 10, wherein the position of the selection indicator relative to the position of the stabilized projected first user interface is further determined based on detection by the camera.

12. The barcode scanning device of claim 7, wherein the selection indicator is stabilized such that the selection indicator is displayed on the surface within a range of movement of the selection indicator.

13. The barcode scanning device of claim 12, wherein the stabilized selection indicator is projected for detection within the field of view of the camera.

14. The barcode scanning device of claim 12, wherein the projected first user interface is manipulated by a user to provide the indication of selection based on a position of the projected first user interface relative to a position of the stabilized selection indicator.

15. The barcode scanning device of claim 14, wherein the position of the projected first user interface relative to the position of the selection indicator is determined based on detection by the camera.

16. A method comprising:

capturing, via a camera component of a barcode scanning device, an image of a barcode on a work item within a field of view of the camera;

decoding, via a processor of the barcode scanning device, the barcode to identify the work item;

projecting, via a light-emitting component of the barcode scanning device and in response to decoding the barcode, a nonstabilized light indicator on a surface of the identified work item; and projecting, via a projector component of the barcode scanning device and in response to decoding the barcode, a stabilized first user interface on the surface of the identified work item, wherein the first user interface includes one or more commands and/or options associated with the identified work item;

detecting, via the processor, a position of the light indicator relative to the stabilized first user interface by recognizing presence of the light indicator within a particular portion of a grid structure associated with the field of view of the camera, and correlating the position of the light indicator detected with a command or option of the one or more commands and/or options of the projected first user interface based on the grid structure, wherein the grid structure is generated using grid technology and is independent of the projected first user interface; and projecting, via the projector component, a second user interface corresponding to the command or option in response to receiving a trigger signal.

17. The method of claim 16, wherein capturing an image of the barcode within a field of view comprises capturing an image of the work item.

18. The method of claim 16, wherein projecting a stabilized first user interface comprises adjusting the projected display based on movement of the barcode scanning device such that the first user interface remains stable on the surface of the identified work item.

19. The method of claim 16, wherein detecting a position of the light indicator relative to the stabilized first user interface comprises:

utilizing camera recognition to identify a command or option of the one or more commands and/or options based on the proximity of the light indicator to the command or option.

\* \* \* \* \*